United States Patent [19]
Ottesen et al.

[11] Patent Number: 5,778,135
[45] Date of Patent: Jul. 7, 1998

[54] REAL-TIME EDIT CONTROL FOR VIDEO PROGRAM MATERIAL

[75] Inventors: Hal H. Ottesen; Gordon J. Smith. both of Rochester, Minn.

[73] Assignee: International Business Machines Corporation, Armonk, N.Y.

[21] Appl. No.: 366,555

[22] Filed: Dec. 30, 1994

[51] Int. Cl.$^6$ .................................... H04N 5/93
[52] U.S. Cl. ............................. 386/52; 386/95
[58] Field of Search ................ 360/14.1, 14.2, 360/14.3, 13.1; 348/7, 13; 358/335, 342, 311; 386/52–46, 125, 126, 95; H04N 5/92, 5/76, 5/93

[56] References Cited

U.S. PATENT DOCUMENTS

| | | | |
|---|---|---|---|
| 4,506,387 | 3/1985 | Walter | 455/612 |
| 4,520,404 | 5/1985 | Von Kohorn | 358/335 |
| 4,930,160 | 5/1990 | Vogel | 280/23 |
| 4,949,187 | 8/1990 | Cohen | 358/335 |
| 5,172,413 | 12/1992 | Bradley et al. | 380/20 |
| 5,195,135 | 3/1993 | Palmer | 380/20 |
| 5,206,722 | 4/1993 | Kwan | 358/86 |
| 5,247,347 | 9/1993 | Litteral et al. | 358/85 |
| 5,253,275 | 10/1993 | Yurt et al. | 375/122 |
| 5,410,343 | 4/1995 | Coddington et al. | 348/7 |
| 5,434,678 | 7/1995 | Abecassis | 358/342 |
| 5,477,263 | 12/1995 | O'Callaghan et al. | 348/7 |
| 5,499,221 | 3/1996 | Ito et al. | 369/32 |

FOREIGN PATENT DOCUMENTS

| | | | |
|---|---|---|---|
| 9013118 | 11/1990 | European Pat. Off. | G11B 15/04 |
| 9103112 | 3/1991 | European Pat. Off. | H04H 1/00 |
| 9212599 | 7/1992 | European Pat. Off. | H04N 7/173 |

OTHER PUBLICATIONS

World Patent Index, Dialog File 351, English Abstract of EP 429139.
World Patent Index, Dialog File 351, English Abstract of FR 2680440.
World Patent Index, Dialog File 351, English Abstract of GB 2088115.
"Prioritization and Transport In The ADTV Digital Simulcast System", K.Joseph, S.Ng, R.Siracusa, D.Raychaudhuri, J.Zdepski, and R.Saint Girons, IEEE Transactions on Consumer Electronics, Aug. 1992, No. 3, New York, US, pp. 319–323.
"Canadian Cable Firm Sets Test Of Sensoring Device," *Wall Street Journal*, Sep. 30, 1994, p. B7.
Futro, Aleksander T., "Digital Compressed VOC –An Alternative System View," periodical and date unknown.
World Patent Index, Dialog File 351, English Abstract of BE 855651.
World Patent Index, Dialog File 351, English Abstract of DE 3029983.
World Patent Index, Dialog File 351, English Abstract of DE 3526017.

(List continued on next page.)

*Primary Examiner*—Tommy P. Chin
*Assistant Examiner*—Y. Lee
*Attorney, Agent, or Firm*—Sterne, Kessler, Goldstein & Fox

[57] ABSTRACT

A system and method for editing program material provide viewers with real-time editing control. Digital program material are divided into relatively short segments and each of these segments are rated to indicate a level of potentially objectionable material contained therein. Each segment is tagged to indicate this rating. Prior to viewing the program material, or during playback of the program material, the viewer determines the rating level at which he or she wishes to view the program material. This rating level is entered into the playback system. Upon playback, the system examines the tag of each segment to determine whether that segment should be played. If a segment is tagged to indicate a rating with a higher level than that requested by the viewer, the tag is edited and not displayed. Thus, the program material is edited in real time as it is displayed to the viewer.

4 Claims, 4 Drawing Sheets

OTHER PUBLICATIONS

World Patent Index, Dialog File 351, English Abstract of DE 3922214.

World Patent Index, Dialog File 351, English Abstract of DE 4136720.

World Patent Index, Dialog File 351, English Abstract of EP 182398.

World Patent Index, Dialog File 351, English Abstract of GB 2096868.

World Patent Index, Dialog File 351, English Abstract of GB 2215555.

World Patent Index, Dialog File 347, English Abstract of JP 03–119853, Norio, Iizuka, "Multi–Medium Recorder."

World Patent Index, Dialog File 347, English Abstract of JP 55–076005, Shinji et al., "Document Generating Device."

World Patent Index, Dialog File 347, English Abstract of JP 56–081617, Toshio, Tabata, "VTR Monitoring Method In Program Sending System Of Plural Channels."

World Patent Index, Dialog File 347, English Abstract of JP 57–012069, Fumio, Nagumo, "Recording And Reproducing Systems."

World Patent Index, Dialog File 347, English Abstract of JP 57–132575, Hirokazu et al., "Automatic Conference Recording Device."

World Patent Index, Dialog File 347, English Abstract of JP 60–219415, Shinya, Yoshida, "Video Tex Communication System."

World Patent Index, Dialog File 347, English Abstract of JP 61–269077, Masaaki, Nakayama, "Electronic Still Camera."

World Patent Index, Dialog File 347, English Abstract of JP 62–119627, Hiroyoshi et al., "Picture Compression System."

World Patent Index, Dialog File 347, English Abstract of JP 62–181536, Yoshio et al., "High Definition Still Picture Signal Recording And Reproducing Device."

World Patent Index, Dialog File 347, English Abstract of JP 62–327001, Hidemitsu et al., "System For Controlling Display For Communication Terminal Equipment."

World Patent Index, Dialog File 347, English Abstract of JP 63–023673, Yukitoshi et al., "Picture Data Transfer System."

World Patent Index, Dialog File 347, English Abstract of JP 63–276509, Mitsuru, Mera, "Method And Device For Picture Information Offering."

World Patent Index, Dialog File 351, English Abstract of NL 8901502.

World Patent Index, Dialog File 351, English Abstract of US 4,473,850.

World Patent Index, Dialog File 351, English Abstract of US 4,752,891.

World Patent Index, Dialog File 351, English Abstract of US 5,153,726.

World Patent Index, Dialog File 351, English Abstract of WO 8805244.

World Patent Index, Dialog File 351, English Abstract of WO 8805245.

World Patent Index, Dialog File 351, English Abstract of WO 8912896.

World Patent Index, Dialog File 351, English Abstract of WO 9110323.

World Patent Index, Dialog File 351, English Abstract of WO 9312481.

World Patent Index, Dialog File 2, English Abstract No. C9207–7320–036, "InTend, Version 1.0," *Laboratory Microcomputer*, vol. 11, No. 1, pp. 35–36, 1992, United Kingdom.

World Patent Index, Dialog File 2, English Abstract No. C84002169, Balaran, A. et al., "The Integrated Text Processor Brings Printing Quality To The Video Screen," *Elektronik Industrie*, vol. 14, No. 7–8, pp. 45–48, 1983, West Germany.

World Patent Index, Dialog File 2, English Abstract No. C83030945, Takagi, M. et al., "DDY 8020 A/B Color Graphic Terminal," *Anritsu Technical Bulletin*, No. 44, pp. 84–92, Mar. 1983, Japan.

World Patent Index, Dialog File 2, English Abstract No. C82042884, Secules, J. et al., "An 8085–Based Controller For A Self–Scan Display," *CoED*, vol. 1, No. 6, pp. 12–15, Nov.–Dec. 1981, U.S.A.

World Patent Index, Dialog File 2, English Abstract No. B82036884, C82026860, Flanagan, J. et al., "Digital Voice Storage In A Microprocessor," *IEEE Transactions On Communications*, vol. COM–30, No. 2, pp. 336–345, Feb. 1982, U.S.A.

REAL-TIME EDIT CONTROL FOR VIDEO PROGRAM MATERIAL

BACKGROUND OF THE INVENTION

1. Field of the Invention

The present invention relates generally to a motion picture editing system, and more specifically to a system and method for providing program material to a viewer at the level requested by the viewer.

2. Related Art

Movies and other types of program material are typically rated to provide the viewing audience with an indication of the level of sensitivity of the program material. In conventional movie rating systems, the rating reflects the highest level of material content. For example, a short scene of violence or nudity in a movie may lead to that movie receiving an R-rating, when the subject matter is otherwise suitable for all audiences. This could have the effect of precluding a large portion of the potential audience from viewing the film.

The preferences of the viewing audience vary greatly across society. Some viewers prefer that certain subject matter be edited from program material before they view it. For example, various individuals in our society may find offense in one or more different subject matters, such as adult situations, language, nudity, violence, and sex. Others may not be offended by these topics but may still want program material edited so that their children aren't exposed to such topics. Still others prefer to view the material uncut and unedited as it was originally intended to be viewed.

However, due to the diverse nature of certain viewing audiences, program material can not always be presented to each individual viewer in the format that he or she prefers. For example, in a first scenario, movies aired on commercial television networks and movies shown in airplanes are often edited to make the material suitable for all viewing audiences. For example, R-rated movies, when aired or shown in these environments are edited to remove the scenes that lead to the R rating. Thus the movie aired or shown is G-rated and suitable for all audiences. However, such editing, referred to as censorship in some circles, means that no viewer in the viewing environment can view the movie in its original form. The individual viewing preferences of some of the viewers are therefore sacrificed so that the viewer group as a whole can view the material.

In a second scenario, non-commercial broadcasts, such as video-on-demand, home box office, pay-per-view, movie rentals and other related services, typically provide movies and other program material in an unedited and uncut form. Therefore, in some features, some of the material aired contains scenes that one or more viewers may find offensive. These viewers may not wish to view these scenes. However, the viewer has little choice in the matter and must impose self editing or self censorship. For example, the viewer may choose not to watch the material at all, or may have to leave the room or close his or her eyes during certain scenes. Also, viewers may have to restrict their children from watching certain material because of these scenes.

As a result, in both of the above scenarios, viewer enjoyment and convenience is sacrificed to some extent. In the first scenario, the individual wishing to view the material uncut and unedited can not do so. In the second scenario, the viewer may have to forego watching an entire movie or program because of a few offensive scenes.

SUMMARY OF THE INVENTION

The present invention is directed toward a system and method for providing real-time edit control for video program material. According to the invention, the viewer determines the rating of the program material he or she wishes to view. For example, the viewer determines whether he or she wants to watch a movie having an R rating, or whether he or she would prefer to watch a G rated version of the same movie. Alternatively, the user can determine whether certain types of material are objectionable, such as violence, language, nudity, etc., and to select one or more of those type of materials be edited from the program material prior to viewing.

In accordance with one embodiment of the invention, the program material is provided in a digital format. The digital data are segmented into relatively short segments. Each segment is rated to indicate the content of that segment. For example, each segment may be rated using the traditional movie rating system, assigning a G, R, X, etc. rating to the segment. Alternatively, each segment can be rated to indicate whether it contains a certain type of material such as strong language, violence, nudity, etc.

Once the segment is rated, a tag is assigned to that segment to indicate the rating. Now, each segment of the program material is rated and tagged to indicate the rating.

Prior to viewing the movie, an editor examines the tag of each segment and determines whether that segment should be edited based on the tag. For example, the viewer may have selected a G version of an R rated movie. In this instance, the editor would examine the tags, and upon finding a tag indicating a segment as rated R, discarding that segment.

In another example, the viewer may indicate whether he or she wishes to view the movie without nudity. In this example, the editor examines the tags, and when one is found indicating the segment contains nudity, that segment is discarded. Thus, the viewer can watch an edited movie without viewing the materials that he or she finds objectionable.

One advantage of the invention is that each viewer, or group of viewers at a given viewing location, can determine the level at which to view the program material. Thus, a viewer wishing to watch an R rated movie with small children present, for example, can select a G-rated version of the movie. Thus, the viewer is given the choice as to whether he or she wishes to have the movie edited.

Another advantage of the invention is that the program material can be provided to the viewer with redundant scenes at different rating levels. In this scenario, a particular portion of the program material that may contain objectionable material is refilmed so that it does not contain such material. Both versions of the scene are provided to the viewer with the segments of that scene tagged accordingly. Thus, when the user selects a particular rating level, the scenes pertaining to that rating are displayed. In this manner, the user can watch a "un-edited" version of a movie in any of a number of different ratings.

Yet another advantage of the invention is that it can be implemented to take advantage of existing video compression techniques. For example, the invention can be implemented to include the tag at the system layer of the MPEG coded data.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Figure 1:
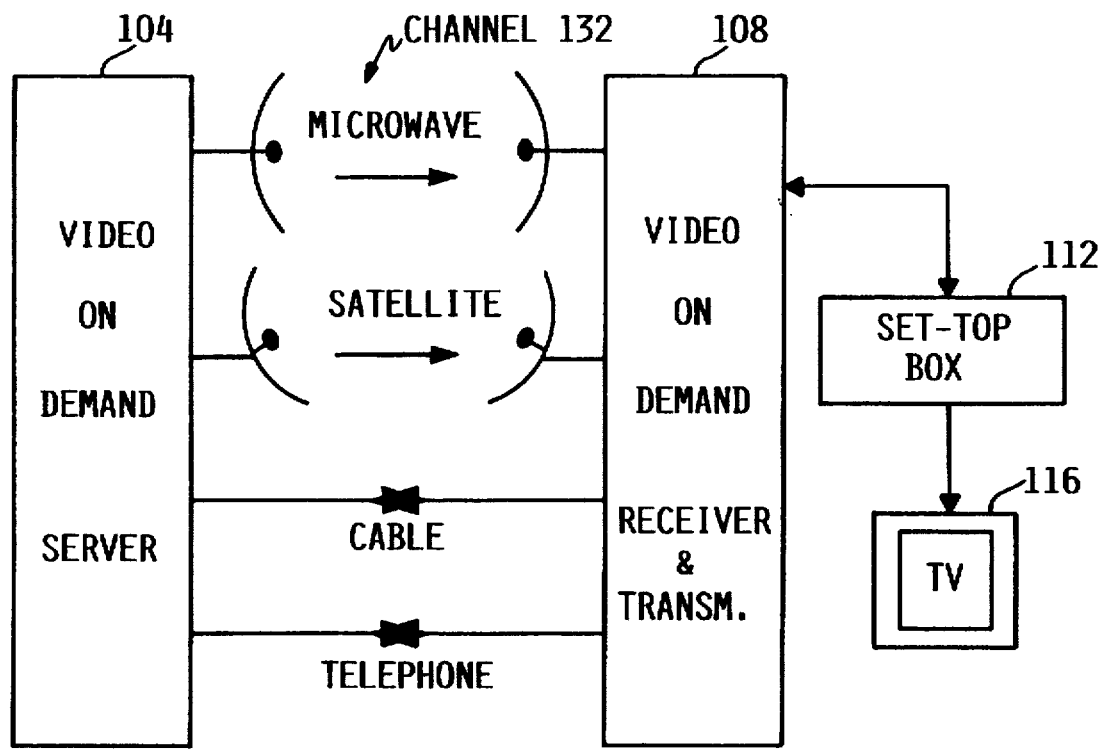
FIG. 1 is a block diagram illustrating a video-on-demand viewing system.

1. Overview and Discussion of the Invention

The present invention is directed toward a system and method for providing viewer-selectable rating control for viewing program material. According to the invention, the viewer determines the rating level at which he or she wishes to view the material. For example, the invention allows a viewer to watch a G-rated version of an R-rated movie if he or she so desires. The program material is then presented on the viewer's television in a form that conforms to the desired rating.

Program material selected by the user is digitized and segmented into blocks, frames, or other segments of digital data. Each segment is rated based on its content, and a tag assigned to indicate the rating of that segment. Upon viewing, the material is edited based on the tag. If the tag of a segment indicates that it contains material the viewer wishes to edit (i.e., offensive material), that segment is not displayed.

Thus, to continue with the example where the viewer wishes to watch a G-rated version of an R-rated movie, the movie is segmented into short segments. Each segment is assigned a rating. Those segments that contain materials contributing to the film's R-rating (e.g., segments containing nudity) are tagged to indicate the R-rating. Segments not contributing to the R-rating are tagged to indicate a G-rating. Upon playback, the tags of each segment are checked. Segments tagged to indicate an R-rating are edited from the material and not provided to television 116.

Because in most movies there are relatively few scenes that contribute to a higher rating, segments containing these scenes can be edited without disrupting the flow of the movie. For example, a very brief scene containing frontal nudity can result in a movie receiving an R-rating. Such a scene can usually be edited without disrupting from the continuity of the movie.

In this document, the term "program material" is used to refer generally to movies, video programs, video games, instructional videos, or other viewing material.

The term "objectionable material" is used to refer to a portion of the program material which a viewer determines is offensive or which the viewer otherwise prefers not to view. The term "objectionable material" can also apply to a portion of the program material that a viewer is not permitted to view for one or more reasons. For example, the embodiments described below, objectionable material can include, but is not limited to: one or more of the group of sex, violence, strong language and nudity; subject matter too difficult and/or too easy for a student's skill level (e.g., outside of the viewer's skill level); subject matter outside of the student's area of study; completed segments in a course of study; skill levels outside of a user's skill level; and/or achievement levels of a game not yet reached by a user.

The term "sensitive material" is used to refer to material that may be subject to a rating. Sensitive material can include, but is not limited to, violence, nudity, adult language, and the like. In alternative environments described below, sensitive material can include, but is not limited to, material subject to difficulty ratings, skill level ratings, area of study limitations, and the like.

This document discusses editing in terms of discarding segments containing objectionable material. Such discarding of one or more segments can be accomplished by editing them out, skipping them during playback, deleting them, replacing them with non-objectionable segments, replacing them with 'filler' segments or by using some other technique to ensure that they are not presented to the viewer.

2. Example Environment

One environment for the invention is that of distribution systems for digital video-on-demand services. One example of such an environment is depicted in FIG. 1. This environment includes a video-on-demand server 104, a video-on-demand receiver/transmitter 108, a set-top box 112, and a television set 116. In one embodiment, video-on-demand receiver/transmitter 108, set-top box 112, and television set 116 are collocated at the viewing location. An example of the viewing location is the viewer's home. However, the viewing location is not limited to this venue.

Video-on-demand services such as the one depicted in FIG. 1, provide program material to a viewer at the viewer's request. In accordance with the video-on-demand services, subscribers can request that a movie or other program material be delivered to their home (or other location) for viewing at a specified time. Thus, instead of travelling to a video store to rent a movie, the subscriber simply orders a movie from video-on-demand server 104.

There is currently a trend toward a national standard for compression in such video-on-demand services. Currently, the leader in this trend is MPEG (moving a picture experts group) proposed standards. The MPEG-1 and MPEG-2 standards provide digital and audio compression and decompression. One of the key features of MPEG is its use of forward and backward prediction to eliminate redundant information in video.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

3. Description of the Invention

In the example environment, the viewer orders program material available from video-on-demand server 104. In response, video-on-demand server 104 downlinks or otherwise transmits the program material to video-on-demand receiver 108. This transmission occurs via channel 132. Although this transmission can be in any of several formats, some typical formats are microwave transmission, satellite transmission, transmission via cable television providers, and transmission across telephone (preferably optical) lines.

Video-on-demand receiver/transmitter 108 receives the signal from video-on-demand server 104, demodulates the program material from the carrier and provides the digital program material to set-top box 112. Video-on-demand receiver/transmitter 108 can also be used to transmit information to the video-on-demand service and to video-on-demand server 104. This information can include information needed for the viewer to order program material.

According to the invention, set-top box 112 includes a controller to edit segments that the viewer does not wish to view. The edited program material is modulated by set-top box 112 for displaying on the viewer's television 116. Set-top box 112 provides the so-called "dial tone" for the video service. Set-top box 112 provides access to video-on-demand server 104 and two-way communications between location 106 and video-on-demand server 104. Where the program material is digitally compressed, set-top box 112 has decompression facilities as well.

The invention can be implemented in environments where the program material is compressed using standards such as MPEG, as well as in environments where the program material is not compressed.

3.1 Individual Rating of Segments

As stated above, a key feature of the invention is that individual segments of digital program material are each rated and encoded with a tag to indicate that rating. One tagging scheme encodes, along with the compressed data, one or more bytes of information that give the video and/or audio ratings for each segment of the program material. Audio tags control vulgarity, ethnic slurs, violent language, etc. Video tags control nudity, obscenity, violence, etc. Alternatively, a single tag can be used to identify a rating for a segment considering that segment's audio and video content.

For system using MPEG compression techniques, the data is comprised of two parts: the system layer and compressed layer data. The information content of the program material (i.e. the audio and video) are compressed and stored in the compression layer. This is a layer at which actual information transfer occurs. In the system layer, timing information as well as other data necessary to demultiplex the sound and video data in the compression layer is stored.

In such a system, tagging is done at the system layer of the data. Thus, in this embodiment, the invention takes advantage of the MPEG structure, and modifies the MPEG system layer to include the tags that indicate the content of each frame of program material.

In one embodiment, tags are added during the compression process when the program material is compressed.

MPEG is based on a sequence of intra-picture frames, also known as I-frames. From these I-frames forward and backward prediction is used to produce P- and B-frames, respectively. Because the I-frames contain the information that the P- and B-frames ultimately use, the system layer is principally concerned with sequencing the I-frames. Therefore, to adequately tag program material compressed according to MPEG, only the I-frames and the associated audio material need to be tagged.

Alternatively, tagging can be applied to time segments of a movie instead of to each individual I-frame. In this embodiment, a digital program material, whether compressed or not, is temporally divided into segments. Each segment is assigned a tag to indicate the rating of the contents of that segment. Thus, the program material could be divided into one-second time segments and each segment tagged to indicate its contents.

Figure 2:
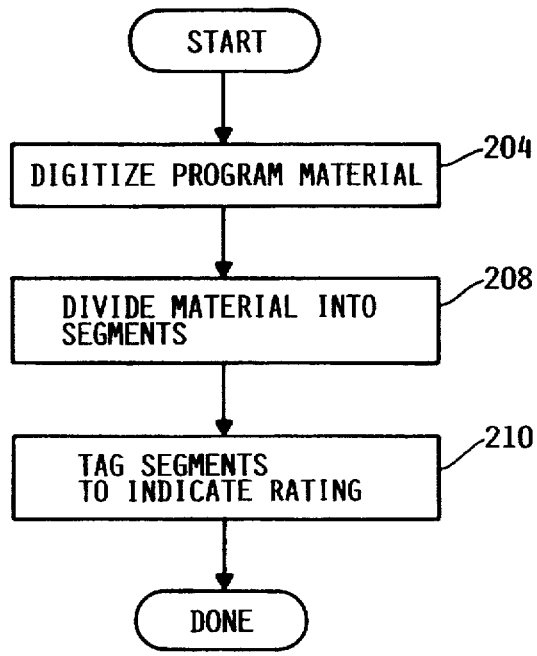
FIG. 2 is an operational flow diagram illustrating the tagging of portions of the program material according to one embodiment of the invention.

This process of tagging the video and audio segments is generally illustrated in FIG. 2. In a step 204, the program material is digitized. In a step 208, digitized program material is broken down into segments. As stated above, these segments could be MPEG I-frames or simple time divisions of the program material. Alternative segmentation techniques can be implemented as well.

In a step 210, each segment is provided with a rating to indicate the content of that segment. In one embodiment, the tags are implemented to indicate a rating standard for the segment. In this embodiment, each segment is rated, for example, in accordance with motion picture standards of G, PG-13, R and X, according to some other standard. If tagged at this level, the user can select a rating level at which he or she wishes to view the program material. If a segment is tagged with a rating above the selected level, that segment is edited. Thus, all segments rated above the selected level will be edited.

In an alternative embodiment, the tagging is performed to indicate a rating of the specific type of material included in the segment. For example, one tag is used to indicate nudity, a different tag indicates violence, a different tag for strong language, and so on. Thus, a user who objects to nudity, but does not object to violence can choose to edit only those scenes containing nudity and not those containing violence. Therefore, this alternative embodiment provides an additional level of editing beyond that provided in the traditional rating system.

In one implementation of the above two embodiments, both audio and video are edited from the movie when a segment containing an objectionable scene is encountered. In this embodiment, the entire segment is edited.

In an alternative embodiment, separate audio tags are implemented to flag objectionable language. By using a separate audio tag, segments containing objectionable language can be edited to remove only the audio portion of those segments. Thus, the audio tags allow the soundtrack to be edited while leaving the video material intact. It should be noted that separate audio and video tags are desired, but not required. Each segment could be provided with a single rating to indicate the level of audio and/or video material contained therein. Thus, the language contained in a particular segment may cause that segment to be tagged at a rating higher than the video material would otherwise warrant, and therefore result in that segment being edited.

It should be further noted that tagging of short segments of audio and video data with rating tags can place a high burden on the material provider. For example, a two hour movie would have 7,200 video and audio tags each. The tagging process is simplified by using look-ahead features in the tagging, e.g., the next 353 frames contain violent scenes. One advantage, however, is that the tagging only has to be done once. After the program material is tagged, it can be viewed in an edited form (and re-edited) as often as desired without re-tagging.

3.2 Receipt and Editing of the Program Material

Figure 3:
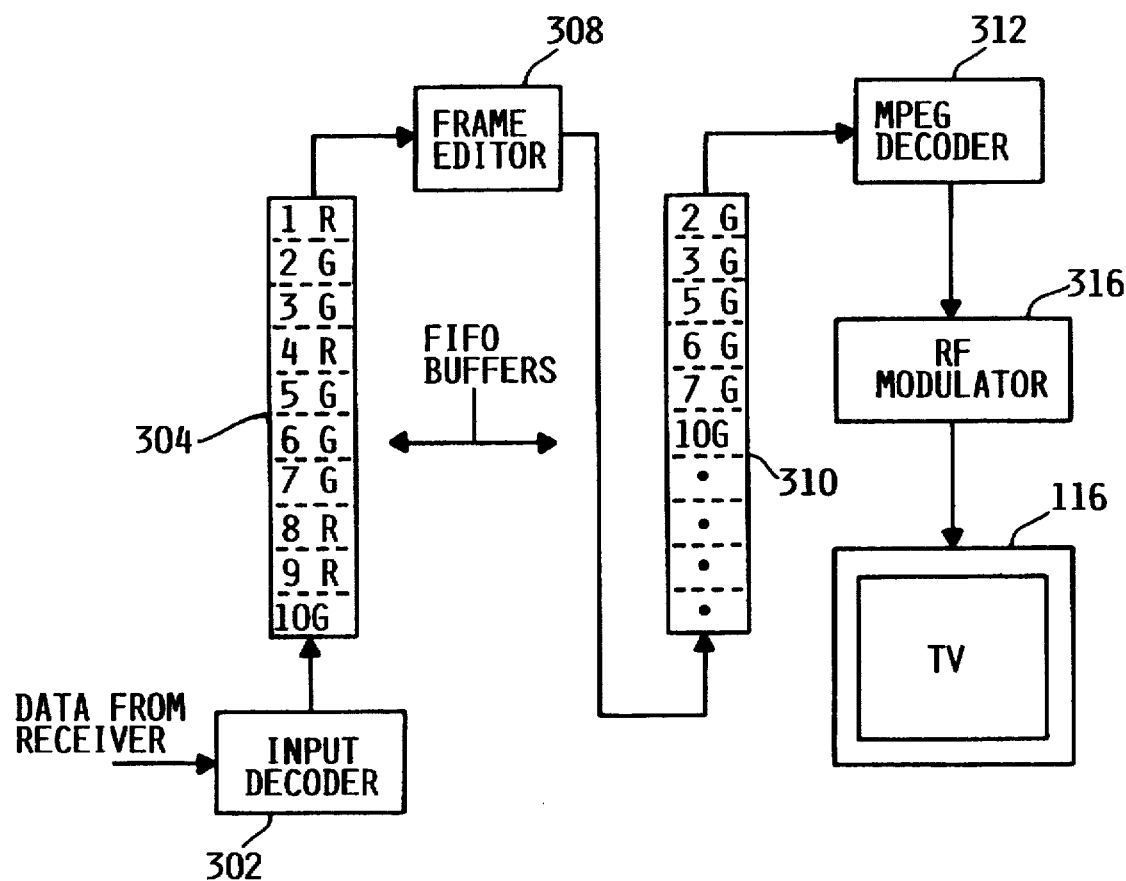
FIG. 3 is a block diagram illustrating a representative architecture of a set-top box according to one embodiment of the invention.

As stated above, once the program material is received it is edited to remove those segments that contain content that the viewer wishes to avoid. In the environment described with respect to FIG. 1, this editing occurs in set-top box 112. FIG. 3 is a block diagram illustrating a representative architecture of set-top box 112 according to one embodiment of the invention. According to this architecture, a set-top box 112 includes a buffer 304, a frame edit controller 308, a buffer 310, an optional MPEG decoder 312, and an RF modulator 316. It should be noted that MPEG decoder 312 is used only where data is compressed according to MPEG standards.

An additional decoder 302 can optionally be provided for decryption and/or video stream reconstruction if transmission is not linearly sequenced. For instance, data transmitted by the server 104 may be sent out-of-order. In this scenario, decoder 302 can ensure that data received are properly stored in buffer 304.

Figure 4:
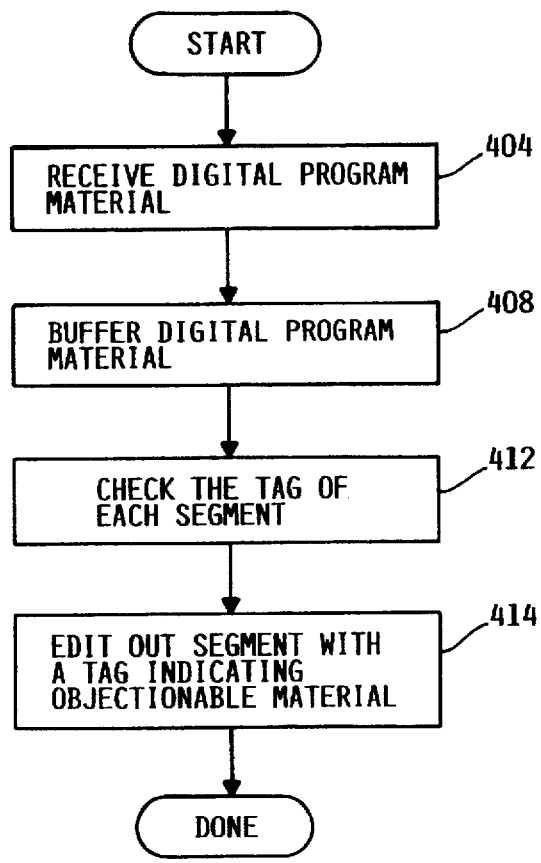
FIG. 4 is an operational flow diagram illustrating an operation of the set-top box according to one embodiment of the invention.

FIG. 4 is an operational flow block diagram illustrating the operation of set-top box 112 according to one embodiment of the invention. In a step 404, set-top box 112 receives digital video from video-on-demand receiver 108. This is digital program material that is transmitted from video-on-demand server 104 to video-on-demand receiver 108 via one of the transmission channels 122. As stated above, this digital program material can be either compressed, or non-compressed.

In a step 408, the digital program material received by video-on-demand receiver 108 is removed from the carrier and forwarded to set-top box 112. In set-top box 112, the digital program material are stored in buffer 304. Buffer 304 is provided to compensate for a non-uniform transmission rate of data from video-on-demand server 104.

In a step 412, frame edit controller 308 checks the tag of each segment of the program material to determine the rating. As stated above, the rating can be a standard rating category such as that provided by traditional movie rating schemes, or it can be a specific rating to indicate an alternative type of rating such as skill level, area of study, and so on.

In a step 414, frame edit controller 308 compare the rating of each segment with the rating selected by the viewer and discards each segment that is tagged with a rating that the viewer indicated is objectionable. The remaining segments are forwarded to second buffer 310. Buffer 310 is provided to ensure that a continuous stream of data is available to RF modulator 316.

From buffer 310, the data are forwarded to RF modulator 316 for presentation to the viewer(s) on television 116. Where compression is used, the edited digital program material is first provided to MPEG decoder 312. Note that other compression standards may be used as well.

In accordance with the example environment described herein, FIG. 3 illustrates an application of the invention for editing movies rated using a traditional movie rating scheme where the ratings G, R, and X are assigned to a movie. As illustrated in FIG. 3, each segment in buffer 304 is tagged with a G or R rating. In the illustrated example, the viewer requested that all R scenes be edited. Such editing is performed by frame editor 308 and only G scenes are presented to buffer 310. As a result, only G-rated scenes are presented to the viewer on television 116 for viewing.

Although FIG. 3 is illustrated in terms of the example environment using traditional movie ratings, alternative rating schemes can be implemented. Such schemes can include ratings for skill level, level of difficulty of material, area of study, progress level, and other ratable categories.

Figure 5:
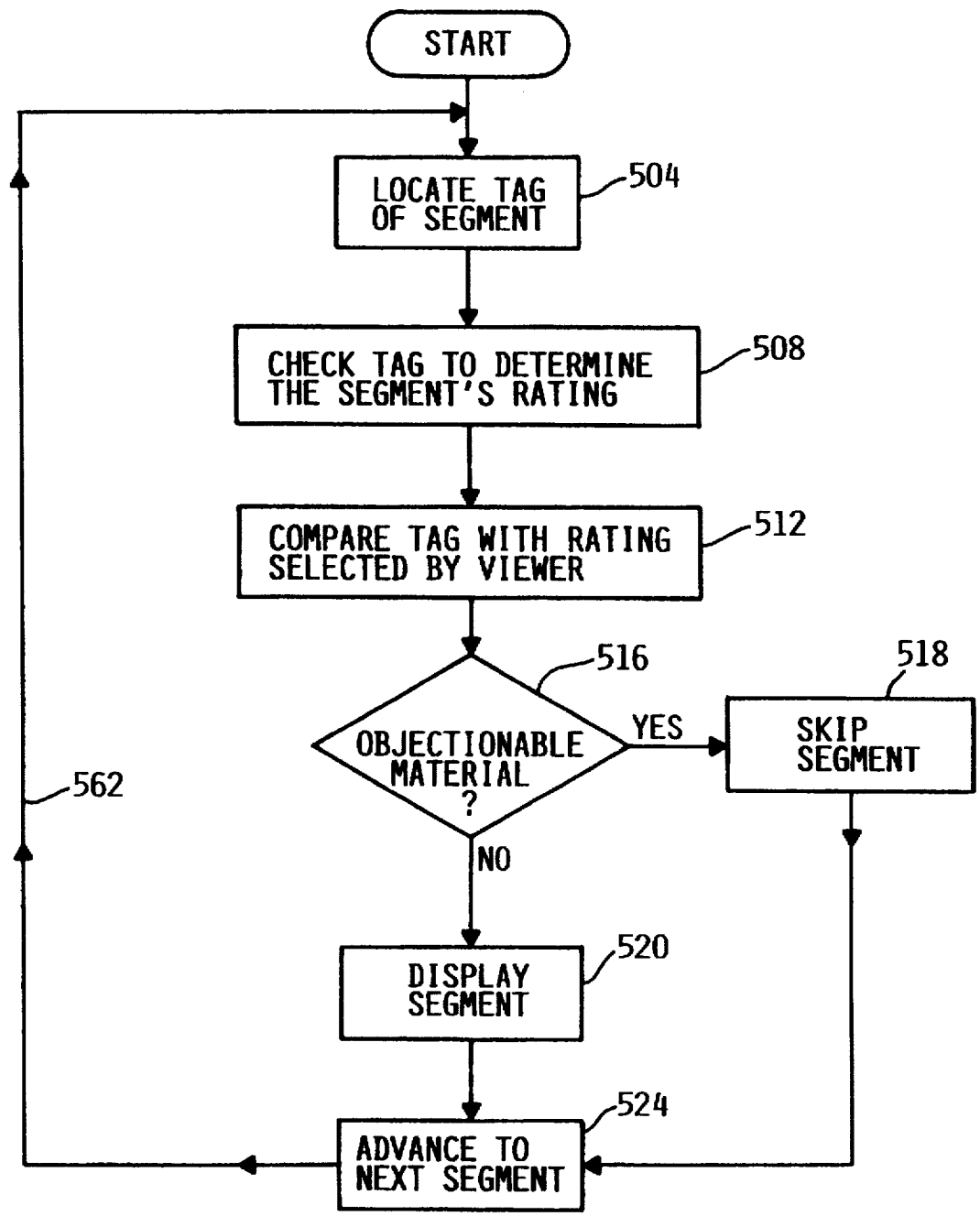
FIG. 5 is an operational flow diagram illustrating a method of editing undesirable segments according to one embodiment of the invention.

FIG. 5 is an operational flow diagram illustrating the manner in which frame edit controller 308 edits undesirable segments. In a step 504, frame edit controller 308 first finds the tag for a received segment of program material. In a step 508, frame edit controller checks the tag to determine the rating of that segment. In one embodiment, frame edit controller checks the rating to determine the level at which the movie is rated (e.g., G, R, X, etc.). In an alternative embodiment, frame edit controller 308 checks the rating to determine if there are one or more specific types of program material that the viewer may find objectionable (e.g., violence, nudity, etc.).

Frame edit controller compares the tag with the rating selected by the viewer. If the rating is above that selected by the viewer, or if the tag indicates a type of material the viewer does not wish to view (decision box 512), the segment is not provided to RF modulator 316. Thus, edited frames are not presented to the viewer for viewing on television 116. If, on the other hand, the frame is not skipped, it is provided to buffer 310 for display on television 116 as indicated in a step 516.

This process is repeated for each segment to determine whether that segment should be presented to the viewer. In one embodiment, buffer 304 is a simple FIFO and each segment is provided to frame edit controller 312 on a periodic basis. In another embodiment, buffer 308 is a circular file and each time frame edit controller checks a frame, a buffer pointer is advanced to extract the next segment of data.

The embodiment described above provides buffer 310 prior to RF modulator 316 (or MPEG decoder 312) to ensure that there is no interruption in the program material as seen on television 116 due to editing by frame edit controller 308. In an alternative embodiment, buffer 310 is omitted. This alternative embodiment is recommended only where there is a reasonable guarantee that video frames are supplied as required to maintain an uninterrupted supply to the frame editor.

In yet another alternative embodiment, the editing of the frames is not done in set-top box 112 but is instead performed prior to transmission of the program material to video-on-demand receiver 108. This alternative has the advantage of reducing the number of frames transmitted but requires complicated control on the part of the video-on-demand service.

3.3 Displaying Edited Materials

As stated above, the segments not edited by edit controller 308, are forwarded for viewing on television 116. In one embodiment, when segments of the program material are edited, they are simply deleted. The material jumps ahead to the end of the deleted portion. Thus, continuing with the example of a viewer selecting a G-rated version of an R-rated movie, only G-rated segments would be shown. All R-rated segments would be skipped.

In an alternative embodiment, program material is transmitted to the user that includes the same scene filmed at several different rating levels. For example, a particular scene in a movie can be filmed in G- and R-rated versions. In this example, a love scene may be filmed in an R-version with nudity displayed and refilmed in a G-version with the actors and actresses attired to conform to the rating standards.

In this embodiment, certain scenes of the program material containing objectionable material are recorded in several different versions and all versions downloaded to the viewer. When the frames are edited, only those versions matching the rating level selected by the user are displayed. Thus, although the viewer may receive several versions of the same scene (e.g., an R- and a G-rated version), only one of those versions is actually shown on television 116. This embodiment simplifies program material delivery from the video-on-demand server perspective.

In yet another alternative, one or more video frames of the program material are buffered and displayed when objectionable frames are edited.

The application of this invention is not limited to video-on-demand services. The tagging in accordance with this invention can also be implemented in digital versions of the program material stored on portable media. For example, movies digitized and stored on a laser disk can also be tagged to provide ratings for each segment. In this example, the video disk player includes an editor to examine the tags and determine which segments should be edited. Thus, a laser disk purchased or rented could be viewed by the viewer at the level he or she desires.

Note that this embodiment is not limited to applications using a video disk player. The invention can be implemented with other types of media playback devices or video playback systems provided the data coding mechanism lends itself to segmentation and tagging. These devices can include, but are not limited to CD ROMs for computers or other entertainment devices, CD-based video games, and other media playback devices. Such playback systems, including laser disk players can be outfitted with a control panel allowing the viewer to enter the desired rating level at which to present the material. The control panel can include a keypad or other input device/mechanism that allows the viewer to enter a passcode to selected certain rating levels.

3.4 Rating Selected By Viewer

As described above, the invention tags video and/or audio segments in program material to indicate the "rating" of the segment. By tagging segments that are sent to the viewer, set-top box 112 is used to decide which frames are actually viewed, and which are edited out. Additionally, separate audio tags can be used to mute the audio signal provided in those segments. This level of control is programmed into set-top box 112 interactively by the viewer.

When selecting movies or the program material to be ordered from the video-on-demand service, the viewer is provided with options and guidance on the program content and the ratings available. The options permit, for example, the viewer to select the allowable level of obscenity, vulgarity, violence, etc. for any program material chosen. Alternatively, the options permit the viewer to select a rating at which he or she wishes to view the program material (e.g., R, G, X, etc.). The information can be provided to the user on the user's television 116, on a display screen of set-top box 112, or in program guide materials (such as the video-on-demand service's version of a TV guide).

Additional information provided to viewers can include information on the percentage content for one or more types of rated material. For example, the information can include the fact that a particular movie contains 10% nudity and 23% violence, or that only 8% of a particular R-rated movie is actually R-rated material. This permits intelligent decision making. For example, a movie with 85% of the material rated "X" can probably not be viewed with a "G" rating without losing continuity. However, because only a small fraction of the material drives the rating of most movies, this typically will not be a problem.

Note that because the editing can be done in real time, the user can change the rating on a movie while the program material is in progress.

In an alternative embodiment, the viewer's account with the material provider can be set up to have a particular rating. In this embodiment, all materials sent to the viewer will be rated at or below a certain level (or will all be provided without certain specified objectionable material) as specified by the viewer's account. Additionally, the account can be set up to provide materials at a certain rating during certain hours (e.g., when the children are awake), and at a higher level rating after hours. These embodiments provide automatic edit control for households that have young children. Also passcodes can be provided to the adults, allowing adults to purchase R and X rated movies, while viewers without the codes (i.e., their children) can only order G-rated features.

4. Alternative Environments

The real-time editing system presented herein is not limited only to the example environment. In fact, as stated above, the invention can be implemented in numerous alternative environments. Two examples of the additional environments are described: the learning environment and the game environment. The program materials in these environments can be provided by commercial or non-commercial television, video-on-demand services, on disk or tape, on CD ROM, or by other means.

In the learning environment, educational materials are provided for the viewer. In one embodiment of this environment, the educational materials are tagged to indicate the level of difficulty of each segment of the educational material. The viewer selects the level of difficulty, or skill level, at which he or she wishes the materials to be presented.

Educational materials may be tagged to indicate a particular area of study. For example, a course in calculus can have its examples tagged based on the student's area of specialty. An engineering student would see examples of calculus problems geared toward engineering applications while a medical student, on the other hand, would be presented with examples relating to the medical field.

In an alternative embodiment of the educational environment, tags can be assigned and reassigned based on past viewer input such as the viewer's past performance or progress. In this embodiment, as the viewer satisfactorily completes a portion of the lesson, the segments of that lesson are tagged to indicate this completion. Other portions for which the viewer requires additional study are tagged as not completed. Upon subsequent viewing, only the material tagged as incomplete is presented to the viewer. Additionally, tagging of a completed section could also lead to the tagging as incomplete of a new section that builds on the completed section. Thus, further viewing leads the viewer automatically to the more advanced material.

In yet another environment, tags can be used to control the material presented to a viewer playing an interactive video game. In one embodiment of the game environment, the tags can be used to indicate the level of difficulty of portions of the game. In this embodiment, the user selects the skill level (e.g., beginner, intermediate, advanced) and is presented with the appropriate portions of the game.

In other embodiments of the game environment a viewer rating is determined based on past viewer input. In one such embodiment, game achievement levels are tagged. In this embodiment, as the user progresses through various portions of the game, he or she may be allowed to "pass" to another level. These levels of achievement are controlled by tags. In still another embodiment, the course of the game is controlled by tags. Decisions made or actions by the viewer during play may lead the viewer down various "paths" of the game. These paths can be controlled by tags.

In still another alternative embodiment, tags can be used to control the material presented to a viewer playing an adventure game or viewing an adventure video. In this embodiment, the course followed is determined based on user input. At certain spots in the adventure game or video, the viewer can determine which course to follow. For example, in numerous adventure games, the viewer is in a room or a chamber and can choose to enter various other rooms or chambers by passing through doorways or portals. Behind each door, a different adventure awaits the viewer. Thus, the viewer selects a rating by selecting a door through which to proceed. Segments corresponding to the adventure waiting behind that door are then loaded and then presented to the viewer.

Note that in these and other embodiments, buffer 310 can be loaded from different modes to present different material to the viewer depending on the viewer's selection of the rating.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for providing a viewer with edit control of video program material, comprising:

means for receiving the video program material, wherein said video program material is divided into a plurality of segments and each segment is tagged to indicate a rating for that segment;

means for providing the viewer with information regarding the percentage of material at a particular rating level in the program material; and means for determining whether each segment is to be presented to the viewer based on said rating, comprising means for examining said tag of each segment to determine said rating for that segment;

means for determining a selected rating level; and means for comparing said rating of that segment to said selected rating level.

2. The system of claim 1 further comprising:

an RF modulator for modulating said segments to be presented to the viewer; and buffer means for buffering the program material prior to modulation to ensure that a continuous stream of data is available to said RF modulator.

3. A method of providing a viewer with edit control of video program material, comprising the steps of:

receiving the video program material, wherein said video program material is divided into a plurality of segments and each segment is tagged to indicate a rating for that segment;

providing the viewer with information regarding the percentage of material at a particular rating level in the program material; and determining whether each segment is to be presented to the viewer based on said rating, wherein said determining step comprises the steps of examining said tag of each segment to determine said rating for that segment;

determining a selected rating level; and comparing said rating of that segment to said selected rating level.

4. The method of claim 3 further comprising the steps of:

modulating said segments to be presented to the viewer; and buffering program material prior to modulation to ensure that a continuous stream of data is available for modulation.

* * * * *